(12) United States Patent
Poniatowski

(10) Patent No.: US 7,766,425 B2
(45) Date of Patent: Aug. 3, 2010

(54) BENCH SEAT WITH MOVABLE BOLSTERS

(75) Inventor: Jeffrey Poniatowski, Royal Oak, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 280 days.

(21) Appl. No.: 11/911,965

(22) PCT Filed: Apr. 21, 2006

(86) PCT No.: PCT/CA2006/000611
§ 371 (c)(1),
(2), (4) Date: Oct. 19, 2007

(87) PCT Pub. No.: WO2007/006122
PCT Pub. Date: Jan. 18, 2007

(65) Prior Publication Data
US 2008/0191533 A1      Aug. 14, 2008

(51) Int. Cl.
*A47C 3/026* (2006.01)
(52) U.S. Cl. .............. 297/284.9; 297/284.1; 297/284.3; 297/248; 297/249
(58) Field of Classification Search .............. 287/284.1, 287/284.3, 284.9, 248, 249; 244/118.6, 122 R
See application file for complete search history.

(56) References Cited

U.S. PATENT DOCUMENTS

| | | | |
|---|---|---|---|
| 5,193,765 A * | 3/1993 | Simpson et al. .......... 244/118.6 |
| 5,282,666 A | 2/1994 | Demick et al. | |
| 5,553,813 A * | 9/1996 | Merensky ................ 244/118.6 |
| 5,662,377 A | 9/1997 | Holdampf | |
| 6,076,768 A * | 6/2000 | Durand et al. ........... 244/118.6 |
| 6,199,951 B1 | 3/2001 | Zeile et al. | |
| 6,793,282 B2 * | 9/2004 | Plant et al. .................. 297/248 |
| 6,905,170 B2 | 6/2005 | McMillen et al. | |
| 7,086,700 B2 * | 8/2006 | Habedank ................ 297/378.1 |
| 7,108,323 B2 * | 9/2006 | Welch et al. ............. 297/284.9 |
| 7,140,680 B2 * | 11/2006 | McMillen et al. ........ 297/284.9 |
| 7,311,358 B2 * | 12/2007 | White et al. ............. 297/284.9 |
| 2004/0140705 A1 | 7/2004 | McMillen et al. | |
| 2004/0155501 A1 | 8/2004 | McMillen et al. | |
| 2005/0046252 A1 | 3/2005 | McMillen | |
| 2005/0093355 A1 | 5/2005 | Habedank | |

FOREIGN PATENT DOCUMENTS

| | | | |
|---|---|---|---|
| CA | 1163910 A | 3/1984 |
| CA | 1289450 C | 9/1991 |

* cited by examiner

*Primary Examiner*—Laurie K Cranmer
(74) *Attorney, Agent, or Firm*—Clark Hill PLC

(57) ABSTRACT

A rear seat assembly is provided for supporting occupants. The seat assembly includes a seat cushion. A pair of spaced apart outer seat backs is pivotally secured to the seat cushion. A middle seat back is pivotally secured to the seat cushion and disposed between the pair of outer seat backs. Each of the pair of outer seat backs includes a pair of spaced apart bolsters pivotally hinged thereto for movement between a retracted position and a deployed position. Each of the outer seat backs also includes an actuating mechanism operatively connected between the pair of bolsters for moving the pair of bolsters between the retracted and deployed positions as one of the outer and middle seat backs pivots relative to the seat cushion.

20 Claims, 6 Drawing Sheets

BENCH SEAT WITH MOVABLE BOLSTERS

FIELD OF THE INVENTION

The invention relates to a rear seat assembly for a motor vehicle. More particularly, the invention relates to a rear seat assembly including bolsters that move between retracted and deployed positions as one of an outer and middle seat back pivots relative to a seat cushion.

DESCRIPTION OF RELATED ART

Many motor vehicles include a front row of seats and at least one rear row of seats positioned directly behind the front row. The front row typically includes a pair of front seats, and the rear row commonly includes a bench seat for accommodating up to three passengers. The bench seat is made up of a pair of outer seating portions and a middle seating portion disposed between the outer seating portions. The middle seating portion is generally flush with each of the neighboring outer seating portions in order to comfortably seat three occupants along the bench seat.

Each of the front seats includes a pair of bolsters or support structures for providing an occupant with lateral support. These bolsters are particularly useful in supporting the occupant during lateral accelerations of the motor vehicle. Though desirable, the installation of such bolsters along the bench seat presents several problems. First, because the bolsters must protrude forward from a seat back of the two outer seating portions, the middle seating portion would be limited to the space between the inboard bolsters of the outer seating portions. This space cannot accommodate a passenger of average size. Second, because the bolsters must protrude forward of the seat back, the presence of such bolsters would prevent flat folding of the seat back against the seat cushion. As a result, storage space that would otherwise be created by the flat folding of the seat back against the seat cushion is instead occupied by the seat back.

SUMMARY OF THE INVENTION

According to one aspect of the invention, a rear seat assembly is provided for supporting occupants. The rear seat assembly includes a seat cushion. A pair of spaced apart outer seat backs is pivotally secured to the seat cushion. A middle seat back is pivotally secured to the seat cushion and disposed between the pair of spaced apart outer seat backs. Each of the outer seat backs includes a pair of spaced apart bolsters pivotally hinged thereto for movement between a retracted position and a deployed position. Each of the outer seat backs also includes an actuating mechanism operatively connected between the pair of bolsters for moving the pair of bolters between the retracted and deployed positions as one of the outer and middle seat backs pivots relative to the seat cushion.

According to another aspect of the invention, there is provided a seat assembly for supporting a plurality of occupants. The seat assembly includes a seat cushion sized to support a plurality of occupants. A pair of spaced apart outer seat backs is pivotally secured the seat cushion. A middle seat back is pivotally secured to the seat cushion and disposed between the pair of spaced apart outer seat backs. Each of the outer seat backs has a pair of spaced apart side bolsters pivotally hinged thereto for movement between a retracted position and a deployed position. The pair of side bolsters operatively connect with said middle seat back, whereby pivotal movement of the middle seat back from the operational position to the stored positions urges the pairs of bolsters of the outer seat backs to the deployed position, and pivotal movement of the middle seat back from the stored position to the operational position releases the pair of bolsters of the outer seat back enabling the pair of bolsters to be moved to the retracted position.

In a further aspect of the present invention, each of the pair of side bolsters are operatively connected with the seat cushion, whereby pivotal movement of a respective outer seat back from the operational position to the stored position releases the pair of bolsters enabling the respective pair of bolsters to be moved to the retracted position.

According to another aspect of the invention, there is provided a method of operating a seat assembly between a plurality of seating configurations, comprising:

providing a seat assembly having a seat cushion, a pair of spaced apart outer seat backs pivotally secured to said seat cushion and each independently and selectively pivotal between an operational position and a stored position and a middle seat back pivotally secured to said seat cushion and disposed between said pair of spaced apart outer seat backs, said middle seat back selectively pivotal between an operational position and a stored position;

providing each of said outer seat backs with a pair of spaced apart side bolsters pivotally hinged thereto for movement between a retracted position and a deployed position;

moving said middle seat back to the stored position and responsively moving each of said pairs of side bolsters to said deployed position, presenting a two passenger configuration;

moving said middle seat back to the operational position and responsively releasing the pair of bolsters of said outer seat back enabling said pair of bolsters to be moved to the retracted position, presenting a generally contiguous seat back surface for a three passenger configuration;

moving one of said outer seat backs from said operational position to said stored position to release said pair of bolsters of said one of said outer seat backs enabling said pair of bolsters to be moved to the retracted position, presenting a one passenger configuration; and moving the other of said outer seat backs from said operational position to said stored position to release said pair of bolsters of said other of said outer seat backs enabling said pair of bolsters to be moved to the retracted position, presenting a stored configuration.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
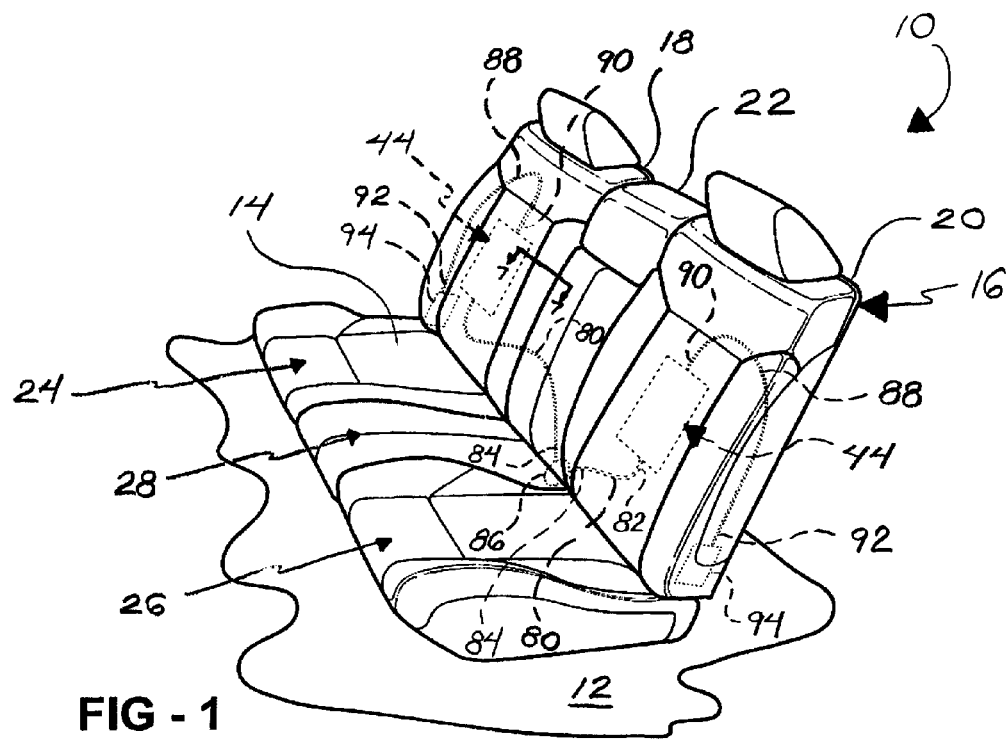
FIG. 1 is a perspective view of a rear seat assembly according to the invention in a three-passenger bench seat configuration.
Figure 2:
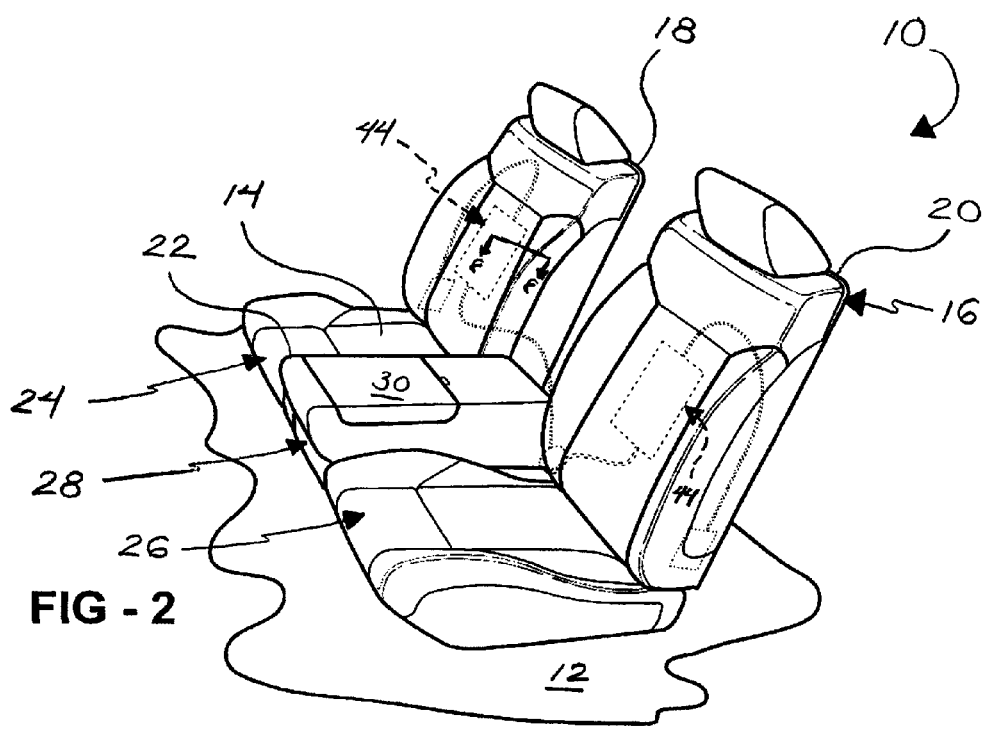
FIG. 2 is a perspective view of the rear seat assembly in a two-passenger configuration including bolsters.
Figure 3:
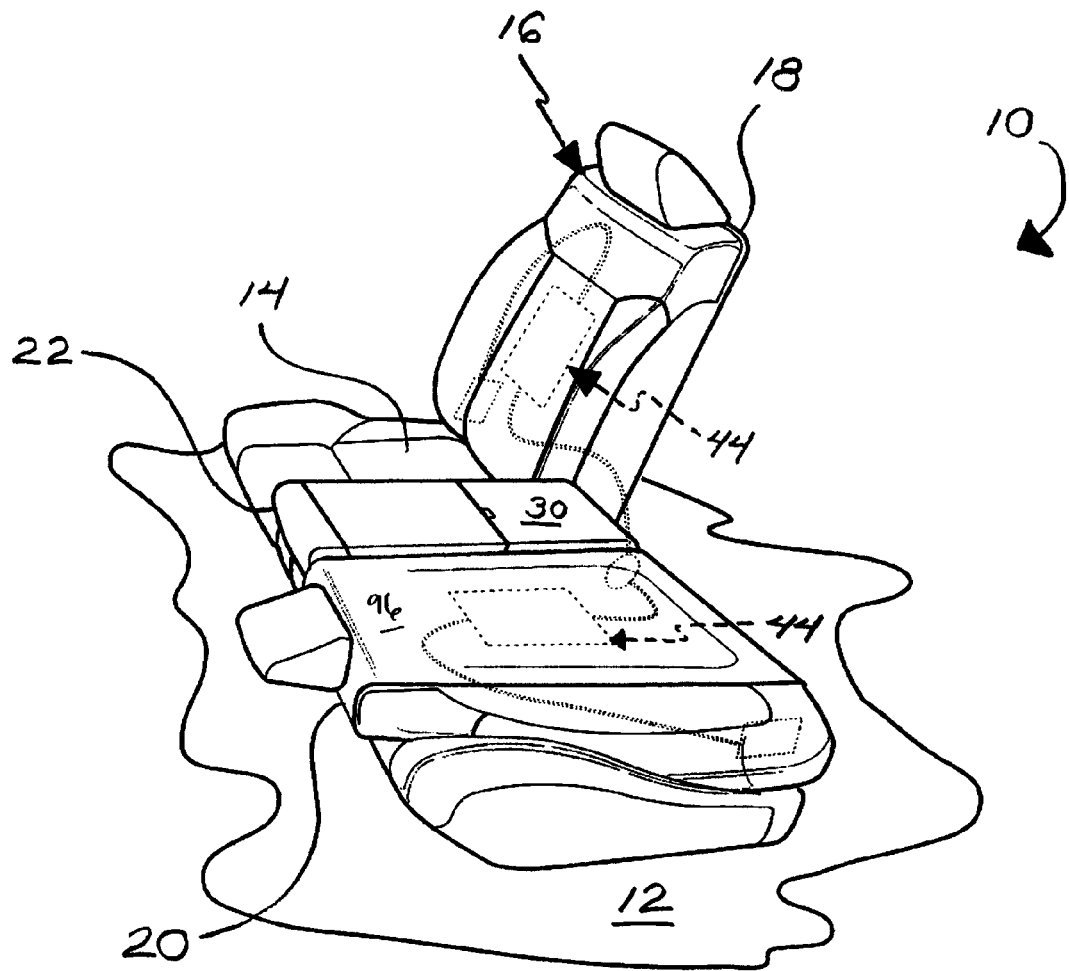
FIG. 3 is a perspective view of the rear seat assembly in a one-passenger configuration.

Referring to FIGS. 1 through 3, a rear seat assembly, generally indicated at 10, is disposed along a motor vehicle floor 12. The rear seat assembly 10 includes a seat cushion 14 and a seat back assembly, generally indicated at 16. The seat back assembly 16 includes a pair of spaced apart outer seat backs 18, 20 each pivotally secured to the seat cushion 14. More specifically, the pair of spaced apart outer seat backs includes a right seat back 18 and a left seat back 20.

The seat back assembly 16 also includes a middle seat back 22 pivotally secured to the seat cushion 14 and disposed between the right 18 and left 20 seat backs. The middle seat back 22 is movable independent of the right 18 and left 20 seat backs between an upright position, shown in FIG. 1, and a folded position, shown in FIGS. 2 and 3. Thus, the rear seat assembly 10 is divided into a right seat portion 24, a left seat portion 26, and a middle seat portion 28. In the folded position, a back surface 30 of the middle seat back 22 serves as an armrest for passengers occupying the right 24 and left 26 seat portions.

Figure 4:
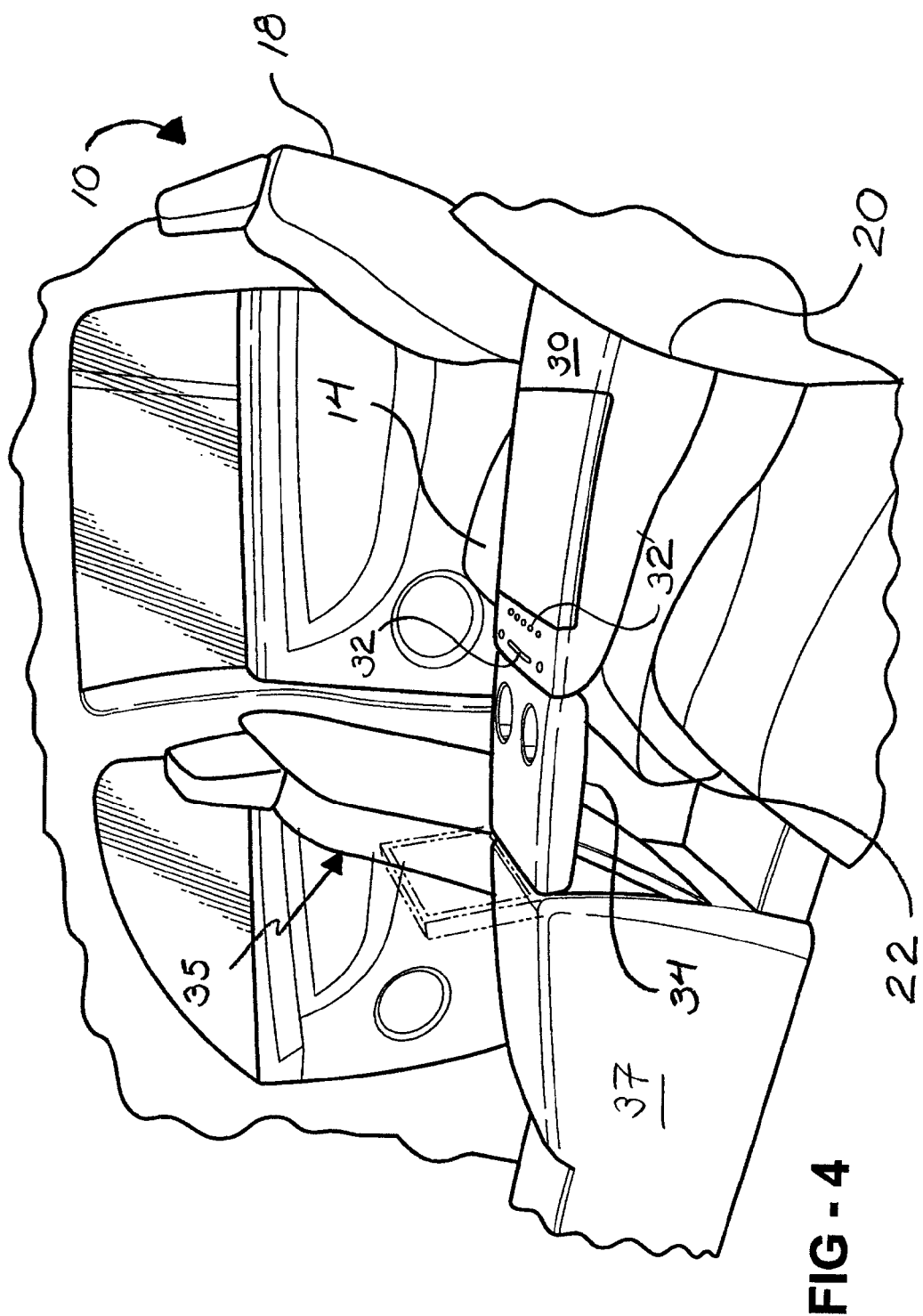
FIG. 4 is a fragmentary, perspective view of a motor vehicle interior including a front panel positioned for mating with a middle seat back of the rear seat assembly.

Referring to FIG. 4, accessory controls 32, 32' optionally are positioned along the back surface 30 of the middle seat back 22. These accessory controls 32, 32' include, but are not limited to, HVAC controls, seat heater controls, seat adjustment controls, cup holders, and display screens. Moreover, when the middle seat back 22 is in the folded position, a panel 34 may be pivoted rearwards away from a center console 37. The panel 34 adjoins with the folded middle seat back 22 to provide a continuous center console extending between the front row seating 35 and the rear seat assembly 10.

It should be appreciated that while only the right seat back 18 is being described and shown, the following description applies equally to the left seat back 20.

Figure 5:
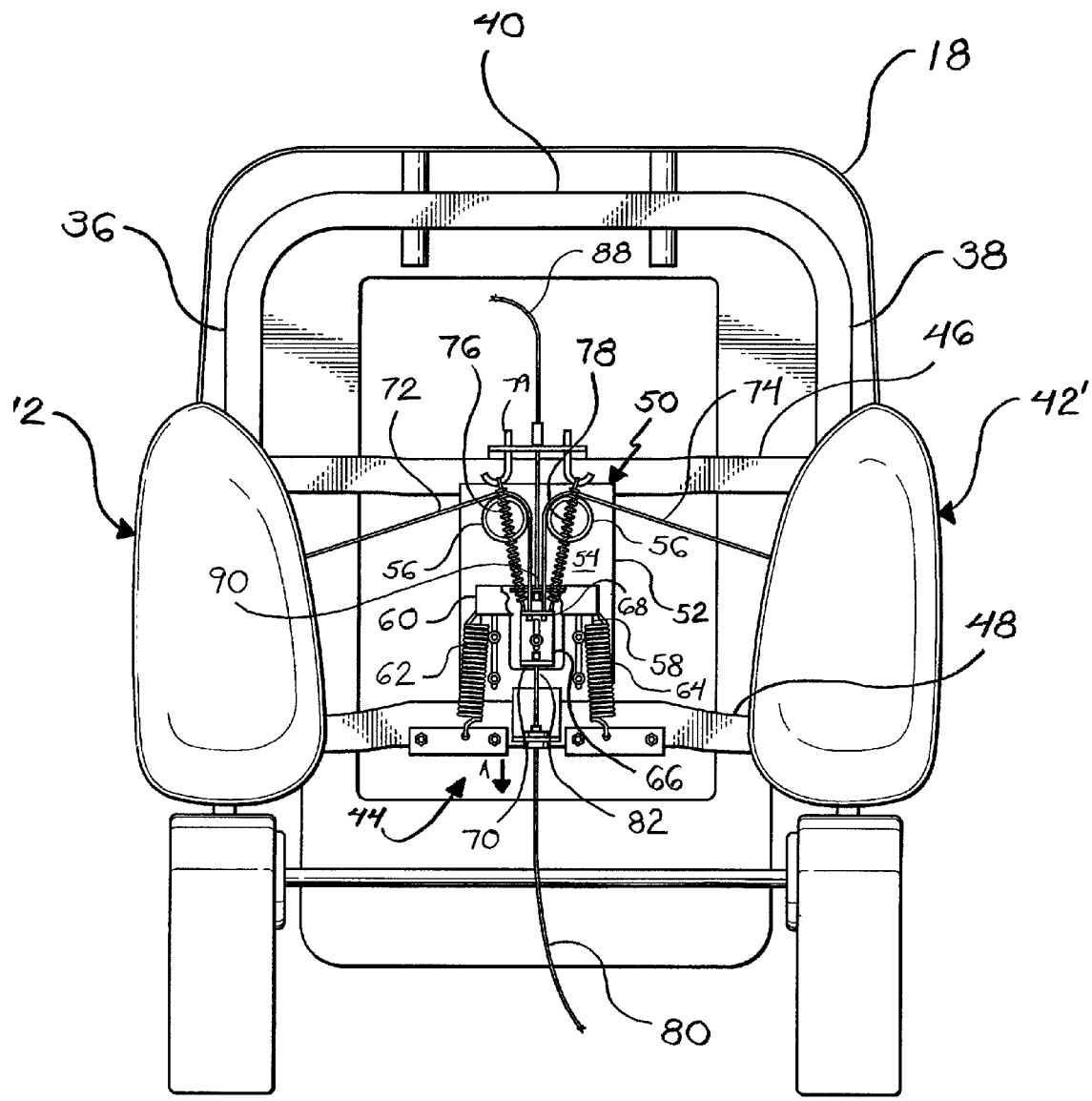
FIG. 5 is a front, elevational view of a right seat back of the rear seat assembly including an actuating mechanism and the bolsters in a retracted position.
Figure 6:
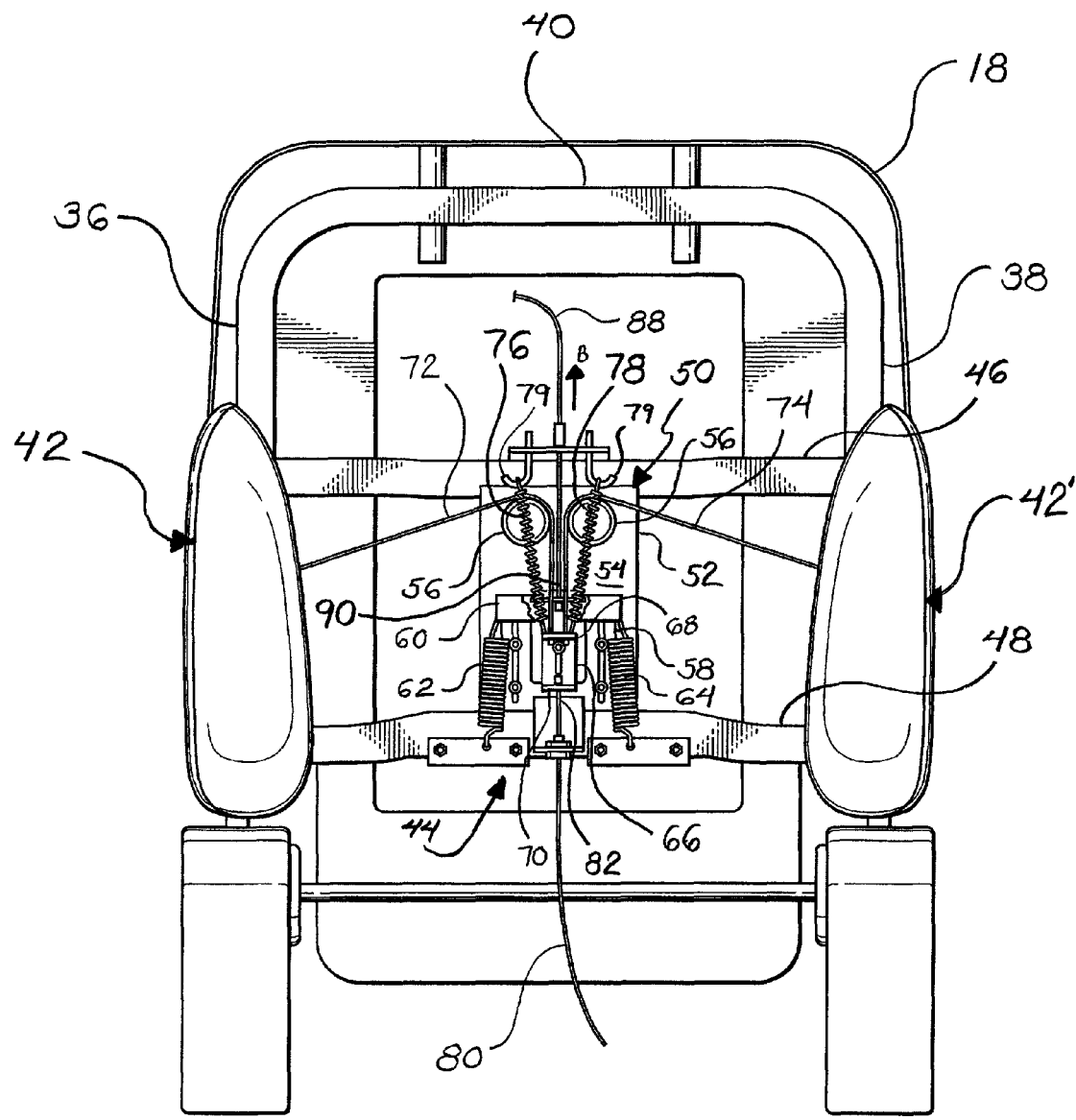
FIG. 6 is a front, elevational view of the right seat back of the rear seat assembly including the bolsters in the deployed position.

Referring to FIGS. 5 and 6, the right seat back 18 includes a pair of spaced apart side frame members 36, 38 and an upper frame member 40 extending between the side frame members 36, 38. Preferably, side frame members 36, 38 and upper frame member 40 is a contiguous C-shaped channel. A bolster 42, 42' is pivotally hinged to each of the pair of spaced apart side frame members 36, 38 for selectively providing lateral support to a passenger occupying the right seat portion 24. The bolsters 42 are movable between a retracted position, shown in FIGS. 5 and 7, and a deployed position, shown in FIGS. 6 and 8.

An actuating mechanism, generally shown at 44, is provided for selectively moving the bolsters 42 between the retracted and deployed positions as one of the right 18, left, 20, and middle 22 seat backs pivots relative to the seat cushion 14.

The actuating mechanism 44 includes a plate assembly, generally indicated at 50, having a bottom plate 52 fixedly secured to a pair of spaced apart cross bars 46, 48, each of which is fixedly secured to and extends between the side frame members 36, 38 of the right seat back 18 to support the actuating mechanism 44. The bottom plate 52 includes a support surface 54. A pair of pulleys 56 is rotatably mounted along the support surface 54 of the bottom plate 52.

The plate assembly 50 also includes a middle plate 58 slidably disposed along the support surface 54 of the bottom plate 52. The middle plate 58 includes a raised cross bar 650 fixedly secured thereto and raised thereabove. A pair of extension springs 62, 64 extends between the cross bar 60 and the lower cross bar 48, and urges the middle plate 58 downwardly.

The plate assembly 50 further includes a top plate 66 slidably disposed along the middle plate 58 and movable relative thereto. The top plate 66 extends between an upper end 68 and an opposing lower end 70. A pair of bolster cables 72, 74 extends out from the upper end 68 of the top plate 66. Each of the pair of bolsters cables 72, 74 is trained about one of the pair of pulleys 56, and is coupled to one of the bolsters 42, 42' via pulley 75 rotatably mounted on the side frame members 36, 38. In addition, a pair of elongated springs 76, 78 extends between the upper end 68 of the top plate 66 and a pair of hook members 79 on the upper cross bar 46.

The actuating mechanism 44 also includes a first Bowden cable 80 extending between a first end 82 fixedly secured to the top plate 66, and a second end 84 fixedly secured to a disc 86, shown in FIG. 1, mounted along a recliner pivot of the middle seat portion 28. A second cable 88 extends between a first end 90 fixedly secured to the cross bar 60, and a second end 92 fixedly secured to a seat cushion bracket 94, shown in FIG. 1, fixedly mounted along each of the right 24 and left 26 seat portions.

The top plate 66 is able to slide relative to the middle plate 58, which in turn is able to slide relative to the bottom plate 52. This configuration allows a certain degree of "lost motion" between the top plate 66 and the middle plate 58. Additionally, the springs 62, 64 and 76, 78 reduce BSR (buzz, squeak and rattle).

Figure 7:
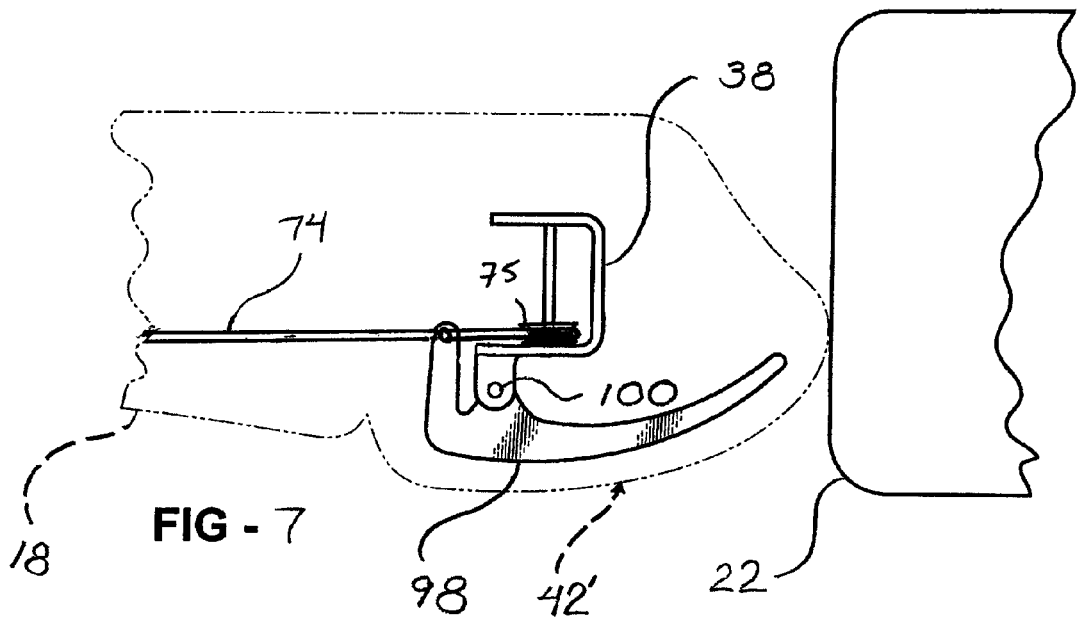
FIG. 7 is a cross-sectional view taken along lines 7-7 in FIG. 1.
Figure 8:
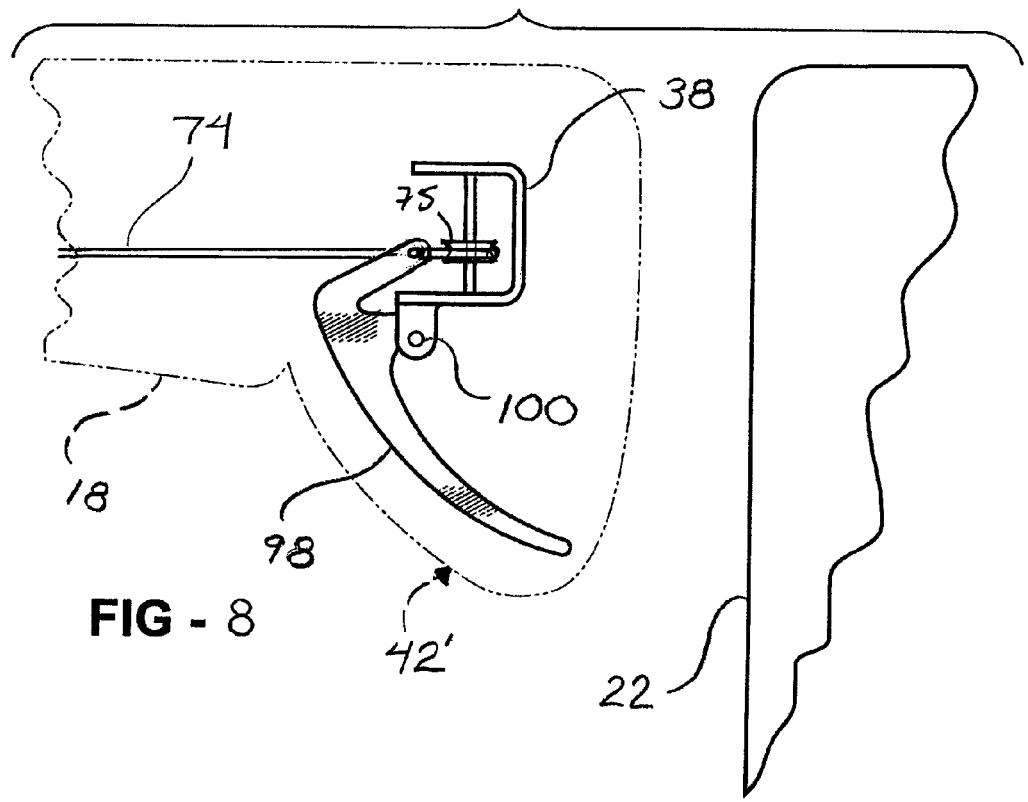
FIG. 8 is a cross-sectional view taken along lines 8-8 in FIG. 2.

Referring to FIGS. 7 and 8, the bolsters 42, 42' are also operably connected to the middle seat back 22. Each bolster 42, 42' includes an L-shaped fin or wing 98 that is pivotally secured to the side frame member 38 about a pivot 100. The fin 98 is also operably connected to the actuating mechanism 44 via one of the pair of bolster cables 72, 74. Each fin 98 moves between a rest position, shown in FIG. 7, and a forward operative position, shown in FIG. 8, as the middle seat back 22 moves between the respective upright and folded positions. Fins 98 provide internal structural support for the bolsters 42, 42'.

When the middle seat back 22 is in the upright position, each fin 98 is in the rest position, thereby placing the bolsters 42, 42' in the retracted position. As a result, the right seat back 18 is flush with the middle seat back 22, as shown in FIG. 7, presenting a generally contiguous seat back surface. When the middle seat back 22 is, however, folded, the fin 98 is urged into the forward position, thereby urging the bolsters 42 into the deployed position to provide lateral support for a passenger occupying the right (and left) seat portion 24.

The rear seat assembly 10 is movable between a plurality of seating configurations for seating three passengers, two passengers, or one passenger. When the rear seat assembly 10 is in a three-passenger bench seat configuration, as shown in FIG. 1, the middle seat back 22 is in the upright position and the bolsters 42, 42' are in the retracted position. When the rear seat assembly 10 is in a two-passenger configuration, as shown in FIG. 2, the middle seat back 22 is in the folded position and the bolsters 42, 42' are in the deployed position for providing lateral support to passengers occupying the right 24 and left 26 seat portions. And when the rear seat assembly 10 is in the one-passenger configuration, as shown in FIG. 3, the middle seat back 22 is in the folded position and one of the right 18 and left 20 seat backs is folded against the seat cushion 14 to provide a load floor for cargo storage. When either of the right 18 and left 20 seat backs is folded as such, the bolsters 42, 42' can be moved back to the retracted position to allow flat folding of one of the right 18 and left 20 seat backs against the seat cushion 14.

In operation, starting with the rear seat assembly 10 in the three-passenger bench seat configuration, as shown in FIG. 1, with the middle seat back 22 in the upright position, the bolsters 42, 42 of each of the seat backs 18, 20 are in the retracted position. A user manually pivots the middle seat back 22 downwards towards the folded position, which causes the recliner and the disc 86 to rotate thereabout, thereby pulling the second end 84 of the first cable 80. As a result, the first end 82 of the first cable 80, shown in FIG. 5, is pulled downwards to move the top plate 66 in the pull direction of arrow A to the position shown in FIG. 6. This pulling of the top plate 66 winds the bolster cables 72, 74 around the respective pulleys 56 and the bolsters 42, 42' are urged into the deployed position, shown in FIG. 6. Thus, the pivoting of the middle seat back 22 into the folded position puts the actuating mechanism 44, in particular the first cable 80, under tension in order to maintain the bolsters 42, 42' in the deployed position. The rear seat assembly 20 is now in a two-passenger configuration, as shown in FIG. 2, in which passengers occupying the right 24 and left 26 seat portions are provided with bolsters 42, 42' deployed for lateral support.

When the rear seat assembly 10 is in the two-passenger seating system, the user may desire to fold one of the right 18 and left 20 seat backs against the seat cushion 14 in order to create additional storage space. To ensure compact folding of one of the right 18 and left 20 seat backs against the seat cushion 14, the bolsters 42, 42' of the respective seat back 18, 20 must be allowed to be moved back to the retracted position. Thus, as one of the right 18 and left 20 seat backs is pivoted downwards relative to the seat cushion 14, the second cable 88 is pulled upwards in the pull direction of arrow B, shown in FIG. 6, since the second cable 88 is fixed to the seat cushion 14 via seat cushion bracket 94 of the recliner. At the same time, tension in the first cable 80 is released as the seat back 18, 20 rotates relative to the disc 86. As a result, the middle plate 58 is urged upwards in the direction of arrow B. And during such upward movement, the middle plate 58 carries the top plate 66 in the same direction. As a result, the bolster cables 72, 74 slacken, releasing the bolsters 42, 42', allowing the bolsters 42, 42' to be moved from the deployed position to the retracted position. One of the right 18 and left 20 seat backs is, therefore, able to fold compactly against the seat cushion 14, as shown in FIG. 3. A back portion 96 of one of the right 18 and left 20 seat backs becomes a load floor for supporting cargo thereabove.

Although one specific actuating mechanism 44 has been shown and described for moving the bolsters 42, 42' between the retracted and deployed positions as one of the right 18, left 20, and middle 22 seat backs pivots relative to the seat cushion 14, it is appreciated that any of numerous actuating mechanisms may be utilized with the rear seat assembly 10.

It is now apparent to those skilled in the art that the bolster actuating mechanism could also be installed on the seat cushion to actuate bolsters on the seat cushion in the same manner as the seat backs.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A seat assembly for supporting a plurality of occupants, said seat assembly comprising:
   a seat cushion;
   a pair of spaced apart outer seat backs pivotally secured to said seat cushion and each independently and selectively pivotal between an operational position and a stored position;
   a middle seat back pivotally secured to said seat cushion and disposed between said pair of spaced apart outer seat backs, said middle seat back selectively pivotal between an operational position and a stored position;
   each of said outer seat backs having a pair of spaced apart side bolsters pivotally hinged thereto for movement between a retracted position and a deployed position, said pair of side bolsters operatively connected with said middle seat back, whereby pivotal movement of said middle seat back from said operational position to said stored positions urges said pairs of bolsters of said outer seat backs to said deployed position, and pivotal movement of said middle seat back from said stored position to said operational position releases the pair of bolsters of said outer seat back enabling said pair of bolsters to be moved to the retracted position.

2. The seat assembly as set forth in claim 1, wherein each of said pair of side bolsters are operatively connected with said seat cushion, whereby pivotal movement of a respective outer seat back from said operational position to said stored position releases said pair of bolsters enabling said pair of bolsters to be moved to the retracted position.

3. The seat assembly as set forth in claim 1, wherein each of said outer seat backs has an actuating mechanism operatively connecting each of said pair of bolsters and said middle seat back.

4. The seat assembly as set forth in claim 3, wherein each of said actuating mechanisms operatively connect each of said pair of bolsters with said seat cushion, whereby pivotal movement of a respective outer seat back from said operational position to said stored position releases said pair of bolsters enabling said pair of bolsters to be moved to the retracted position.

5. The seat assembly as set forth in claim 4, wherein said actuating mechanisms each comprise a mounting plate and a sliding plate, said sliding plate slidably mounted on said mounting plate for reciprocating movement, said sliding plate is operatively connected to said pair of bolsters, said middle seat back and said seat cushion.

6. The seat assembly as set forth in claim 5, wherein said sliding plate has a lost motion connection between said middle seat back and said seat cushion.

7. The seat assembly as set forth in claim 6, wherein said lost motion connection comprises a middle plate slidably mounted between said sliding plate and said mounting plate.

8. The seat assembly as set forth in claim 7, wherein each of said actuating mechanisms includes a first cable operatively connected to said middle seat back.

9. The seat assembly as set forth in claim 8, wherein each of said actuating mechanisms includes a second cable operatively connected to said seat cushion.

10. The seat assembly as set forth in claim 9, wherein said first cable is connected to said sliding plate and said second cable is connected to said middle plate.

11. The seat assembly as set forth in claim 10, wherein said middle plate has a spring urging said middle plate in a pull direction of said first cable and said top plate has a spring urging said top plate in a pull direction of said second cable.

12. The seat assembly as set forth in claim 11, wherein said pull direction of said first cable is opposite the pull direction of the second cable.

13. The seat assembly as set forth in claim 12, wherein said middle seat back has a disc operatively connected to each of said first cables, whereby rotation of said middle seat back rotates said disc to tension and release said first cables.

14. The seat assembly as set forth in claim 13, wherein each of said actuating mechanisms include a pair of bolster cables extending between said top plate and each of said pair of bolsters, whereby tensioning the bolster cables moves said bolsters to said deployed position.

15. The seat assembly as set forth in claim 14, wherein each of said bolsters include a fin pivotally mounted to said seat backs.

16. The seat assembly as set forth in claim 15, wherein said middle seat back has a storage compartment.

17. The seat assembly as set forth in claim 16, wherein said middle seat back has a set of accessory controls mounted on a back surface thereof.

18. A method of operating a seat assembly between a plurality of seating configurations, said method comprising:
providing a seat assembly having a seat cushion, a pair of spaced apart outer seat backs pivotally secured to said seat cushion and each independently and selectively pivotal between an operational position and a stored position and a middle seat back pivotally secured to said seat cushion and disposed between said pair of spaced apart outer seat backs, said middle seat back selectively pivotal between an operational position and a stored position;
providing each of said outer seat backs with a pair of spaced apart side bolsters pivotally hinged thereto for movement between a retracted position and a deployed position;
moving said middle seat back to the stored position and responsively moving each of said pairs of side bolsters to said deployed position, presenting a two passenger configuration; and
moving said middle seat back to the operational position and responsively releasing the pair of bolsters of said outer seat back enabling said pair of bolsters to be moved to the retracted position, presenting a generally contiguous seat back surface for a three passenger configuration.

19. The method as set forth in claim 18, further comprising:
moving one of said outer seat backs from said operational position to said stored position to release said pair of bolsters of said one of said outer seat backs enabling said pair of bolsters to be moved to the retracted position, presenting a one passenger configuration.

20. The method as set forth in claim 19, further comprising:
moving the other of said outer seat backs from said operational position to said stored position to release said pair of bolsters of said other of said outer seat backs enabling said pair of bolsters to be moved to the retracted position, presenting a stored configuration.

* * * * *